(12) United States Patent
Akazawa

(10) Patent No.: US 9,281,130 B2
(45) Date of Patent: Mar. 8, 2016

(54) ELECTROLYTIC SOLUTION FOR ALUMINUM ELECTROLYTE CAPACITOR, AND ALUMINUM ELECTROLYTE CAPACITOR USING THE SAME

(71) Applicant: Sanyo Chemical Industries, Ltd., Kyoto (JP)

(72) Inventor: Yoshihiko Akazawa, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 130 days.

(21) Appl. No.: 14/351,554

(22) PCT Filed: Oct. 2, 2012

(86) PCT No.: PCT/JP2012/075482
§ 371 (c)(1),
(2) Date: Apr. 11, 2014

(87) PCT Pub. No.: WO2013/054691
PCT Pub. Date: Apr. 18, 2013

(65) Prior Publication Data
US 2014/0284514 A1     Sep. 25, 2014

(30) Foreign Application Priority Data

Oct. 14, 2011 (JP) ................................ 2011-227077

(51) Int. Cl.
*H01G 9/035* (2006.01)
*H01G 9/045* (2006.01)

(52) U.S. Cl.
CPC .............. *H01G 9/035* (2013.01); *H01G 9/045* (2013.01); *Y02T 10/7022* (2013.01)

(58) Field of Classification Search
CPC ................. H01G 9/035; H01G 9/045; H01G 2009/0025; H01G 2009/0408
See application file for complete search history.

(56) References Cited

U.S. PATENT DOCUMENTS

| 8,177,994 B2 * | 5/2012 | Taguchi ................. | H01G 9/035 252/62.2 |
| 8,828,261 B2 * | 9/2014 | Nishitani ............... | H01G 9/035 252/62.2 |
| 2012/0235072 A1 | 9/2012 | Nishitani et al. | |

FOREIGN PATENT DOCUMENTS

| JP | 2007-221111 | | 8/2007 |
| JP | 2008-135693 | | 6/2008 |
| JP | 2010-034301 A | | 2/2010 |
| WO | WO 2011/064939 | * | 6/2011 |
| WO | WO-2011/064939 A1 | | 6/2011 |

OTHER PUBLICATIONS

International Search Report mailed Dec. 18, 2012, in corresponding PCT application No. PCT/JP2012/075482.
Letter and Supplementary European Search Report, received Aug. 10, 2015 from the foreign associate regarding EP patent application No. 12839505.0.

* cited by examiner

*Primary Examiner* — Carol M Koslow
(74) *Attorney, Agent, or Firm* — Locke Lord LLP

(57) ABSTRACT

The invention provides an electrolytic solution for an aluminum electrolyte capacitor with which there is little deterioration of the electrolytic solution properties, the sparking voltage is high, and shorting does not occur, even when the voltage used is high. The invention also provides an electrolyte (C) formed from anions of at least one phosphoric acid alkyl ester (A) and amidinium cations (B), at least one boric acid compound (F) selected from the group consisting of boric acid and boric acid esters, a C2-15 carboxylic acid (D) formed from carbon atoms, oxygen atoms, and hydrogen atoms only, and an organic solvent (E).

20 Claims, No Drawings

ELECTROLYTIC SOLUTION FOR ALUMINUM ELECTROLYTE CAPACITOR, AND ALUMINUM ELECTROLYTE CAPACITOR USING THE SAME

CROSS-REFERENCE TO RELATED APPLICATIONS

This application is the U.S. national phase application pursuant to 35 U.S.C. §371 of PCT International Patent Application No. PCT/JP2012/075482, filed Oct. 2, 2012, which claims priority to Japanese Patent Application No. 2011-227077, filed Oct. 14, 2011. The contents of the foregoing applications are incorporated herein by reference in their entirety.

TECHNICAL FIELD

The present invention relates to an electrolytic solution for aluminum electrolytic capacitors and to an aluminum electrolytic capacitor using the same.

BACKGROUND ART

Aluminum electrolytic capacitors are widely used in cars, household electric appliances, and so forth. Recently, electrolytic solutions that are little in property degradation of an electrolytic solution and high in sparking voltage have increasingly been desired for aluminum electrolytic capacitors with increase in working voltage of power supplies for vehicle-mounted electrical components and digital home appliances.

As an electrolytic solution for aluminum electrolytic capacitors, disclosed in Patent Document 1 is an electrolytic solution comprising an organic solvent and an electrolyte composed of a quaternary ammonium cation of a compound having a substituted amidine group, such as 1-methylimidazole and 1,2-dimethylimidazoline, and an alkyl phosphate anion. Although the electrolytic solution is little in characteristic degradation and high in sparking voltage, there has been a problem that a short circuit occurs suddenly and therefore it is difficult to use practically.

PRIOR ART DOCUMENTS

Patent Documents

Patent Document 1: JP-A-2008-135693

SUMMARY OF THE INVENTION

Problems to be Solved by the Invention

An object of the present invention is to provide an electrolytic solution that is little in property degradation of the electrolytic solution and high in sparking voltage and does not allow a short circuit to occur even if the working voltage is high, and an aluminum electrolytic capacitor using the same.

Solutions to the Problems

The present invention is directed to an electrolytic solution for aluminum electrolytic capacitors, comprising an electrolyte (C) comprising at least one alkyl phosphate anion (A) selected from the group consisting of anions represented by the following formula (1) and anions represented by the following formula (2) and an amidinium cation (B), at least one boric acid compound (F) selected from the group consisting of boric acid and a borate (F1), a carboxylic acid (D) having 2 to 15 carbon atoms consisting of carbon atoms, oxygen atoms, and hydrogen atoms, and an organic solvent (E); and an aluminum electrolytic capacitor using the electrolytic solution.

[Chemical Formula 1]

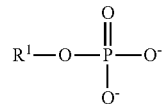

(1)

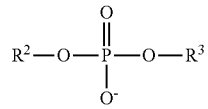

(2)

In formula (1), R1 is an alkyl group having 1 to 10 carbon atoms.

In formula (2), R2 is an alkyl group having 1 to 10 carbon atoms, and R3 is a hydrogen atom or an alkyl group having 1 to 10 carbon atoms.

Advantages of the Invention

The electrolytic solution of the present invention is little in property degradation of the electrolytic solution and high in sparking voltage and does not allow a short circuit to occur even if the working voltage is high.

MODE FOR CARRYING OUT THE INVENTION

Alkyl Phosphate Anion (A)

The alkyl phosphate anion (A) of the electrolyte (C) that constitutes the electrolytic solution of the present invention is an anion represented by the above formula (1), an anion represented by the above formula (2), or a mixed anion thereof, and from the viewpoints of specific conductivity and sparking voltage, the number of the carbon atoms of the alkyl groups (when R1, R2, and R3 are alkyl groups) is 1 to 10, preferably 1 to 8, even more preferably 1 to 6, and particularly preferably 1 to 4. The fewer the carbon atoms, the higher specific conductivity and sparking voltage, whereas the more the carbon atoms, the higher heat resistance.

Examples of the alkyl phosphate anion (A) include (1) a monoanion and a dianion of a monoalkyl phosphate, and (2) a monoanion of a dialkyl phosphate. Specific example of the alkyl phosphate anion (A) are as follows.

(1) Monoalkyl Phosphates {Corresponding to Alkyl Phosphate Anions (Dianions) Represented by Formula (1) and Alkyl Phosphates Represented by Formula (2) (R3 is a Hydrogen Atom; Monoanions)}

Monomethyl phosphate, monoethyl phosphate, monopropyl phosphates [mono(n-propyl) phosphate and mono(isopropyl) phosphate], monobutyl phosphates [mono(n-butyl) phosphate, mono(isobutyl) phosphate, and mono(tert-butyl) phosphate], monopentyl phosphates, monohexyl phosphates, monoheptyl phosphates, monooctyl phosphates [mono(2-ethylhexyl) phosphate, etc.], and so forth.

(2) Dialkyl Phosphates {Corresponding to Alkyl Phosphate Anions (Monoanions) Represented by Formula (2)}

Dimethyl phosphate, diethyl phosphate, ethyl methyl phosphate, butyl methyl phosphate, ethyl butyl phosphate, dipropyl phosphates [di(n-propyl) phosphate and di(isopropyl) phosphate], dibutyl phosphates [di(n-butyl) phosphate, di(isobutyl) phosphate, and di(tert-butyl) phosphate], dipentyl phosphates, dihexyl phosphates, diheptyl phosphates, dioctyl phosphates [bis(2-ethylhexyl) phosphate, etc.], and so forth.

Alkyl phosphate anions (A) may be used either individually or in a combination of two or more. Alternatively, a mixture of a monoanion and a dianion may also be used.

Among these, monoanions represented by formula (2) wherein R2 and R3 are alkyl groups having 1 to 8 carbon atoms are preferred; dimethyl phosphate anion, diethyl phosphate anion, di(n-propyl)phosphate anion, di(isopropyl) phosphate anion, di(n-butyl)phosphate anion, di(isobutyl) phosphate anion, di(tert-butyl)phosphate anion, and bis(2-ethylhexyl) phosphate anion are more preferred.

While industrially available alkyl phosphates are generally mixtures of a monoalkyl phosphate, a dialkyl phosphate and a trialkyl phosphate, it is preferable in the present invention to use a dialkyl phosphate as the alkyl phosphate anion (A). While the method for obtaining a dialkyl phosphate anion is not particularly restricted, preferred is a method which includes mixing an amidinium salt (monomethyl carbonate, hydroxide, etc.) and an industrially available trialkyl phosphate and perform hydrolysis, thereby obtaining a salt of an amidinium cation with a dialkyl phosphate anion.

<Amidinium Cation (B)>

The amidinium cation (B) includes cyclic amidinium cations. Specific examples of the amidinium cation (B) are provided below.

(1) Imidazolinium Cation 1,2,3,4-Tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,2,3-trimethylimidazolinium, 1,3-dimethyl-2-ethylimidazolinium, 1-ethyl-2,3-dimethylimidazolinium, 1,2,3-triethylimidazolinium, 4-cyano-1,2,3-trimethylimidazolinium, 3-cyanomethyl-1,2-dimethylimidazolinium, 2-cyanomethyl-1,3-dimethylimidazolinium, 4-acetyl-1,2,3-trimethylimidazolinium, 3-acetylmethyl-1,2-dimethylimidazolinium, 4-methylcarboxymethyl-1,2,3-trimethylimidazolinium, 3-methylcarboxymethyl-1,2-dimethylimidazolinium, 4-methoxy-1,2,3-trimethylimidazolinium, 3-methoxymethyl-1,2-dimethylimidazolinium, 4-formyl-1,2,3-trimethylimidazolinium, 3-formylmethyl-1,2-dimethylimidazolinium, 3-hydroxyethyl-1,2-dimethylimidazolinium, 4-hydroxymethyl-1,2,3-trimethylimidazolinium, 2-hydroxyethyl-1,3-dimethylimidazolinium, etc.

(2) Imidazolium Cation 1,3-Dimethylimidazolium, 1,3-diethylimidazolium, 1-ethyl-3-methylimidazolium, 1,2,3-trimethylimidazolium, 1,2,3,4-tetramethylimidazolium, 1,3-dimethyl-2-ethylimidazolium, 1-ethyl-2,3-dimethyl-imidazolium, 1,2,3-triethylimidazolium, 1,2,3,4-tetraethylimidazolium, 1,3-dimethyl-2-phenylimidazolium, 1,3-dimethyl-2-benzylimidazolium, 1-benzyl-2,3-dimethyl-imidazolium, 4-cyano-1,2,3-trimethylimidazolium, 3-cyanomethyl-1,2-dimethylimidazolium, 2-cyanomethyl-1,3-dimethyl-imidazolium, 4-acetyl-1,2,3-trimethylimidazolium, 3-acetylmethyl-1,2-dimethylimidazolium, 4-methylcarboxymethyl-1,2,3-trimethylimidazolium, 3-methylcarboxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, 2-hydroxyethyl-1,3-dimethylimidazolium, etc.

(3) Tetrahydropyrimidinium Cation 1,3-Dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 8-methyl-1,8-diazabicyclo[5,4,0]-7-undecenium, 5-methyl-1,5-diazabicyclo[4,3,0]-5-nonenium, 4-cyano-1,2,3-trimethyl-1,4,5,6-tetrahydropyrimidinium, 3-cyanomethyl-1,2-dimethyl-1,4,5,6-tetrahydropyrimidinium, 2-cyanomethyl-1,3-dimethyl-1,4,5,6-tetrahydropyrimidinium, 4-acetyl-1,2,3-trimethyl-1,4,5,6-tetrahydropyrimidinium, 3-acetylmethyl-1,2-dimethyl-1,4,5,6-tetrahydropyrimidinium, 4-methylcarboxymethyl-1,2,3-trimethyl-1,4,5,6-tetrahydropyrimidinium, 3-methylcarboxymethyl-1,2-dimethyl-1,4,5,6-tetrahydropyrimidinium, 4-methoxy-1,2,3-trimethyl-1,4,5,6-tetrahydropyrimidinium, 3-methoxymethyl-1,2-dimethyl-1,4,5,6-tetrahydropyrimidinium, 4-formyl-1,2,3-trimethyl-1,4,5,6-tetrahydropyrimidinium, 3-formylmethyl-1,2-dimethyl-1,4,5,6-tetrahydropyrimidinium, 3-hydroxyethyl-1,2-dimethyl-1,4,5,6-tetrahydropyrimidinium, 4-hydroxymethyl-1,2,3-trimethyl-1,4,5,6-tetrahydropyrimidinium, 2-hydroxyethyl-1,3-dimethyl-1,4,5,6-tetrahydropyrimidinium, etc.

(4) Dihydropyrimidinium Cation 1,3-Dimethyl-1,4- or -1,6-dihydropyrimidinium [these are denoted as 1,3-dimethyl-1,4(6)-dihydropyrimidinium], and the same expression is used in the following], 1,2,3-trimethyl-1,4(6)-dihydropyrimidinium, 1,2,3,4-tetramethyl-1,4(6)-dihydropyrimidinium, 1,2,3,5-tetramethyl-1,4(6)-dihydropyrimidinium, 8-methyl-1,8-diazabicyclo[5,4,0]-7,9(10)-undecadienium, 5-methyl-1,5-diazabicyclo[4,3,0]-5,7(8)-nonadienium, 4-cyano-1,2,3-trimethyl-1,4(6)-dihydropyrimidinium, 3-cyanomethyl-1,2-dimethyl-1,4(6)-dihydropyrimidinium, 2-cyanomethyl-1,3-dimethyl-1,4(6)-dihydropyrimidinium, 4-acetyl-1,2,3-trimethyl-1,4(6)-dihydropyrimidinium, 3-acetylmethyl-1,2-dimethyl-1,4(6)-dihydropyrimidinium, 4-methylcarboxymethyl-1,2,3-trimethyl-1,4(6)-dihydropyrimidinium, 3-methylcarboxymethyl-1,2-dimethyl-1,4(6)-dihydropyrimidinium, 4-methoxy-1,2,3-trimethyl-1,4(6)-dihydropyrimidinium, 3-methoxymethyl-1,2-dimethyl-1,4(6)-dihydropyrimidinium, 4-formyl-1,2,3-trimethyl-1,4(6)-dihydropyrimidinium, 3-formylmethyl-1,2-dimethyl-1,4(6)-dihydropyrimidinium, 3-hydroxyethyl-1,2-dimethyl-1,4(6)-dihydropyrimidinium, 4-hydroxymethyl-1,2,3-trimethyl-1,4(6)-dihydropyrimidinium, 2-hydroxyethyl-1,3-dimethyl-1,4(6)-hydropyrimidi, etc.

Amidinium cations (B) may be used either individually or in a combination of two or more thereof. Among the above, (1) imidazolinium cations and (2) imidazolium cations are preferred. Among these, preferred are 1,2,3,4-tetramethylimidazolinium, 1-ethyl-2,3-dimethylimidazolinium, 1-ethyl-3-methylimidazolium, and 1-ethyl-2,3-dimethylimidazolium.

<Electrolyte (C)>

Examples of the combination of the alkyl phosphate anion (A) and the amidinium cation (B) include a combination of a monoanion with a monocation, a combination of a dianion with a monocation, and a combination of a monocation with a mixture of a monoanion and a dianion.

A salt of a monoanion and a monocation is preferred as the electrolyte (C), and specific examples of the salt are provided below.

1,2,3,4-Tetramethylimidazolinium.monomethyl phosphate anion, 1,2,3,4-tetramethylimidazolinium.dimethyl phosphate anion, 1,2,3,4-tetramethylimidazolinium.monoethyl phosphate anion, 1,2,3,4-tetramethylimidazolinium.diethyl phosphate anion, 1,2,3,4-tetramethylimidazolinium mono(n-propyl) phosphate anion, 1,2,3,4-tetramethylimidazolinium.di(n-propyl) phosphate anion, 1,2,3,4-tetramethylimidazolinium.mono(iso-propyl) phosphate anion, 1,2,3,4-tetramethylimidazolinium.di(iso-propyl) phosphate anion, 1,2,3,4-tetramethylimidazolinium.mono(n-butyl) phosphate anion, 1,2,3,4-tetramethylimidazolinium.di(n-butyl)phosphate anion, 1,2,3,4-tetramethylimidazolinium.mono(iso-butyl) phosphate anion, 1,2,3,4-tetramethylimidazolinium.di(iso-butyl) phosphate anion, 1,2,3,4-tetramethylimidazolinium.mono(tert-butyl) phosphate anion, 1,2,3,4-tetramethylimidazolinium.di(tert-butyl) phosphate anion, 1,2,3,4-tetramethylimidazolinium.mono (2-ethylhexyl) phosphate anion, 1,2,3,4-tetramethylimidazolinium.bis(2-ethylhexyl)phosphate anion, 1-ethyl-2,3-dimethylimidazolinium.monoethyl phosphate anion, 1-ethyl-2,3-dimethylimidazolinium.diethyl phosphate anion, 1-ethyl-3-methylimidazolium.monoethyl phosphate anion, 1-ethyl-3-methylimidazolium.diethyl phosphate anion, 1-ethyl-2,3-dimethylimidazolium.monoethyl phosphate anion, 1-ethyl-2,3-dimethylimidazolium.diethyl phosphate anion, etc.

<Carboxylic Acid (D)>

The carboxylic acid (D) is a carboxylic acid composed of only a carbon atom, an oxygen atom, and a hydrogen atom and includes (1) divalent to tetravalent polycarboxylic acids and (2) monocarboxylic acids. Although the number of the carbon atoms of the carboxylic acid (D) is 2 to 15, a number of 4 to 10 is preferable from the viewpoint of specific conductivity. Although the acid dissociation exponent (pKa) is 3.8 to 5.5, a pKa of 4.0 to 5.2 is more preferable from the viewpoint of long-term stability. In the case of a polycarboxylic acid, while there are two or more acid dissociation exponents (pKa), at least one acid dissociation exponent (pKa) among them is 3.8 to 5.5. Preferably, the smallest acid dissociation exponent (pKa) among them is within that range. Carboxylic acids (D) may be used either individually or in a combination of two or more. If the carboxylic acid (D) is added, the alkyl phosphate anion (A) is stabilized, so that decomposition of the alkyl phosphate anion (A) can be suppressed, and the electrolytic solution is little in property degradation and high in sparking voltage and does not allow a short circuit to occur even if the working voltage is high. Specific examples of the carboxylic acid (D) are provided below.

(1) Divalent to Tetravalent Polycarboxylic Acid

Examples of the aliphatic polycarboxylic acid include saturation polycarboxylic acids (succinic acid, glutaric acid, adipic acid, pimelic acid, suberic acid, azelaic acid, sebacic acid, etc.), unsaturated polycarboxylic acids (maleic acid, citraconic acid, fumaric acid, itaconic acid, etc.), and so forth, and examples of the aromatic polycarboxylic acid include phthalic acid, isophthalic acid, terephthalic acid, trimellitic acid, pyromellitic acid, etc.

(2) Monocarboxylic Acid

Examples of an aliphatic monocarboxylic acid include saturated monocarboxylic acids (formic acid, acetic acid, propionic acid, butyric acid, isobutyric acid, valeric acid, caproic acid, enanthic acid, caprylic acid, pelargonic acid, lauric acid, myristic acid, stearic acid, behenic acid, etc.), unsaturated monocarboxylic acids (acrylic acid, methacrylic acid, crotonic acid, oleic acid, etc.), and so forth, and examples of an aromatic monocarboxylic acid include benzoic acid, cinnamic acid, naphthoic acid, etc.

Among these, aliphatic polycarboxylic acids are preferred as the carboxylic acid (D), and divalent aliphatic carboxylic acids (adipic acid, azelaic acid, sebacic acid, etc.) are more preferred.

<Organic Solvent (E)>

The organic solvent (E) includes (1) alcohols, (2) ethers, (3) amides, (4) oxazolidinone, (5) lactones, (6) nitriles, (7) carbonates, (8) sulfones, and (9) and other organic solvents. Specific examples of the organic solvent (E) are given below.

(1) Alcohol

Monohydric alcohols (methyl alcohol, ethyl alcohol, propyl alcohol, butyl alcohol, diacetone alcohol, benzyl alcohol, aminoalcohol, furfuryl alcohol, etc.), dihydric alcohols (ethylene glycol, propylene glycol, diethylene glycol, hexylene glycol, etc.) trihydric alcohols (glycerol, etc.), tetrahydric alcohols (hexitol, etc.), and so forth.

(2) Ether

Monoethers (ethylene glycol monomethyl ether, ethylene glycol monoethyl ether, ethylene glycol monophenyl ether, tetrahydrofuran, 3-methyltetrahydrofuran, etc.), diethers (ethylene glycol dimethyl ether, ethylene glycol diethyl ether, diethylene glycol monomethyl ether, diethylene glycol monoethyl ether, etc.), triethers (diethylene glycol dimethyl ether, diethylene glycol diethyl ether, etc.), and so forth.

(3) Amide

Formamides (N-methylformamide, N,N-dimethylformamide, N-ethylformamide, N,N-diethylformamide, etc.), acetamides (N-methylacetamide, N,N-dimethylacetamide, N-ethylacetamide, N,N-diethylacetamide, etc.) propionamides (N,N-dimethylpropionamide, etc.), pyrrolidones (N-methylpyrrolidone, N-ethylpyrrolidone, etc.), hexamethylphosphorylamide, and so forth.

(4) Oxazolidinone

N-Methyl-2-oxazolidinone, 3,5-dimethyl-2-oxazolidinone, etc.

(5) Lactone

γ-Butyrolactone (hereinafter described as GBL), α-acetyl-γ-butyrolactone, β-butyrolactone, γ-valerolactone, δ-valerolactone, etc.

(6) Nitrile

Acetonitrile, propionitrile, butyronitrile, acrylonitrile, methacrylonitrile, benzonitrile, etc.

(7) Carbonate

Ethylene carbonate, propylene carbonate, butylene carbonate, dimethyl carbonate, diethyl carbonate, etc.

(8) Sulfone

Sulfolane, dimethylsulfone, etc.

(9) Other Organic Solvents 1,3-Dimethyl-2-imidazolidinone, dimethyl sulfoxide, aromatic solvents (toluene, xylene, etc.), paraffin solvents (normal paraffin, isoparaffin, etc.), and so forth.

Organic solvents (E) may be used either individually or in a combination of two or more. Among these, alcohols, lactones, and sulfones are preferred, GBL, sulfolane, and ethylene glycol are more preferred, and a mixed solvent of GBL and ethylene glycol is particularly preferred.

The content of the carboxylic acid (D) is preferably 0.5 to 5% by weight, more preferably 1 to 3% by weight, and even more preferably 1.5 to 3% by weight based on the total weight of the electrolyte (C) and the organic solvent (E). When the content of (D) is 0.5% by weight or more, there is less risk of a short circuit, and when the content is 5% by weight or less, it is possible to reduce characteristic degradation.

From the viewpoints of specific conductivity and solubility in an organic solvent, the content of the electrolyte (C) is preferably 5 to 70% by weight, particularly preferably 10 to 40% by weight based on the total weight of the electrolyte (C) and the organic solvent (E).

From the viewpoint of specific conductivity, the content of the organic solvent (E) is preferably 30 to 95% by weight, particularly preferably 60 to 90% by weight based on the total weight of the electrolyte (C) and the organic solvent (E).

<Boric Acid Compound (F)>

The boric acid compound (F) is at least one member selected from the group consisting of boric acid and a borate (F1).

The borate (F1) is an esterification product from boric acid and an alcohol (G). The alcohol (G) includes (1) monohydric alcohols and (2) polyhydric alcohols. These alcohols (G) may be used in a combination of two or more of them. Preferred as the borate (F1) is a reaction product formed by reacting a monohydric alcohol and/or a polyhydric alcohol with boric acid. Specific examples of the alcohol (G) are given below.

(1) Monohydric Alcohol

Examples of the monohydric alcohol include alcohols having 1 to 10 carbon atoms, and monoalkyl ethers of glycol. Specific examples are methyl alcohol, ethyl alcohol, propyl alcohol, butyl alcohol, ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, etc.

(2) Polyhydric Alcohol

Examples of the polyhydric alcohol include alcohols having 1 to 10 carbon atoms. Specific examples are dihydric alcohols (ethylene glycol, propylene glycol, diethylene glycol, triethylene glycol, hexylene glycol, etc.), trihydric alcohols (glycerol, etc.), tetrahydric alcohols (hexitol, etc.), and so forth.

The borate (F1) is preferably the one formed by reacting the above-described alcohol with boric acid under, for example, the reaction conditions described below. The reaction product is a mixture of many compounds and it is difficult to be described accurately with its composition.

Reaction conditions: boric acid and an alcohol (G) are mixed together, and the resulting mixture is heated to the range of from 60 to 90° C., and then the pressure is reduced slowly to the range of from 4.0 to 6.0 kPa and esterification (dehydration) is carried out. After reaching a target pressure, esterification is carried out by further heating to the range of from 100 to 110° C. The reaction is carried out at 4.0 to 6.0 kPa until no further distillation of water and low boiling components occurs, so that a borate (F1) can be obtained.

As to the feeding proportions of the raw materials to be fed during the production of the borate (F1), that of boric acid is 25 to 70% by weight, preferably 40 to 60% by weight.

The equivalent ratio of boric acid to the alcohol (G) is boric acid/alcohol (G)=from 0.1/0.01 to 0.1/0.3, more preferably from 0.1/0.02 to 0.1/0.15.

As a combination of a boric acid compound (F) and an organic solvent (E), a combination of boric acid and a mixed solvent of a dihydric alcohol and a lactone as (E), a combination of a borate (F1) and a lactone solvent, and a combination of a borate (F1) and a mixed solvent of a dihydric alcohol and a lactone as (E) are preferred. A combination of boric acid and a mixed solvent of γ-butyrolactone and ethylene glycol as (E) and a combination of a borate (F1) and a mixed solvent of γ-butyrolactone and ethylene glycol as (E) are more preferred, and a combination of boric acid and a mixed solvent of γ-butyrolactone and ethylene glycol as (E) is particularly preferred.

The molar ratio (anion/cation) of the anion and the cation in the electrolyte (C) is preferably from 0.8 to 1.2, more preferably from 0.9 to 1.1, and particularly preferably from 0.95 to 1.05 from the viewpoint of corrosion of a capacitor member {sealing rubber, aluminum oxide foil, etc. of an aluminum electrolytic capacitor}. If the molar ratio is from 0.8 to 1.2, the liquid characteristic of the electrolytic solution does not get to the alkaline side and therefore the electrolytic solution is less likely to deteriorate butyl rubber that is a sealing rubber of an aluminum electrolytic capacitor, so that failures, such as leakage of an electrolytic solution from a capacitor, are less likely to occur. Moreover, the liquid characteristic of the electrolytic solution does not get to the acid side and therefore the aluminum oxide foil of an anode is less likely to corrode, so that failures, such as a short circuit, are less likely to occur.

Preferably, the electrolytic solution of the present invention further comprises water. If the electrolytic solution contains water, it is possible to provide capacitor members (e.g., an aluminum oxide foil serving as an anode foil) with an improved chemical forming property (property of forming, if there is a defect in the surface of an anode foil, an oxide film to repair the defect). On the other hand, if the content of water is excessively large, the hydrolysis of the alkyl phosphate anion becomes easier to proceed, so that phosphoric acid resulting from the hydrolysis will corrode capacitor members. Therefore, when water is contained, the content of the water is preferably 0.01 to 5% by weight, more preferably 0.05 to 1% by weight, and particularly preferably 0.1 to 0.5% by weight based on the total weight of the electrolyte (C), the boric acid compound (F), the carboxylic acid (D), and the organic solvent (E). The content of water is measured in accordance with JIS K0113:2005 "8. Karl-Fischer titration method, 8.1 Quantitative Titration Method" {corresponding to International Standard ISO 760:1978; the disclosure of which is incorporated herein by reference}.

To the electrolytic solution of the present invention, various additives that are used ordinarily for electrolytic solutions may be added, as needed. Examples of such additives include nitro compounds (e.g., o-nitrobenzoic acid, p-nitrobenzoic acid, m-nitrobenzoic acid, o-nitrophenol and p-nitrophenol). From the viewpoint of specific conductivity and solubility in an electrolytic solution, the added amount of such additives is preferably 5% by weight or less, and particularly preferably 2% by weight or less based on the total weight of the electrolyte (C) and the organic solvent (E).

The electrolytic solution of the present invention is suited for an aluminum electrolytic capacitor. The aluminum electrolytic capacitor is not particularly restricted and for example, may be a rolled-up aluminum electrolytic capacitor. Specific examples include a capacitor fabricated by rolling up an anode (aluminum oxide foil) having aluminum oxide formed on a surface of the anode and a cathode aluminum foil with a separator interposed therebetween. An aluminum electrolytic capacitor can be fabricated by impregnating a separator with the electrolytic solution of the present invention as an electrolytic solution for driving the electrolytic capacitor, placing the separator impregnated in the electrolytic solution into a bottomed tubular aluminum housing together with an anode and a cathode, and sealing the opening of the aluminum housing with a sealing rubber.

EXAMPLES

The following illustrates examples of the present invention, but the present invention is not limited to it.

Production Example of Electrolyte (C)

A methanol solution of 1,2,3,4-tetramethylimidazolinium methyl carbonate salt was obtained by dropping 2,4-dimethylimidazoline (0.1 mol) into a methanol solution (74% by weight) of dimethyl carbonate (0.2 mol), followed by stirring at 120° C. for 15 hours.

A mixture of diethyl phosphate and triethylamine was obtained by stirring triethyl phosphate (TEP: produced by DAIHACHI CHEMICAL INDUSTRY CO., LTD.) (0.1 mol) and diethylamine (0.15 mol) in a pressure-resistant vessel at 100° C. for 20 hours. A methanol solution of 1,2,3,4-tetramethylimidazolinium methyl carbonate salt (0.1 mol) was added thereto and a salt-exchange reaction was carried out, so that a methanol solution of a 1,2,3,4-tetramethylimidazolinium diethyl phosphate monoanion was obtained. After heating the solution at 80° C. under a vacuum level of 1.0 kPa or less until no further methanol and an amine component distilled, the temperature was raised from 50° C. to 100° C., followed by heating for 30 minutes to distil monomethyl carbonate (HOCO2CH3), methanol and carbon dioxide (methanol and carbon dioxide are generated slightly due to thermal decomposition of monomethyl carbonate), so that an electrolyte (C-1) {1,2,3,4-tetramethylimidazolinium diethyl phosphate monoanion} was obtained.

Production Example 1 of Boric Acid Ester (F1)

Diethylene glycol monomethyl ether (0.3 mol) and boric acid (0.1 mol) were mixed and the resulting mixture was heated to 90° C., and then the pressure was reduced slowly to 4.0 kPa and esterification (dehydration) was carried out. After reaching a target pressure, esterification was carried out by further heating to 100 to 110° C. The reaction was carried out at 4.0 kPa until no further distillation of water and low boiling components occurred, so that a borate (F1-1) was obtained.

Production Example 2 of Boric Acid Ester (F1)

Triethylene glycol (0.2 mol) and boric acid (0.3 mol) were mixed and the resulting mixture was heated to 90° C., and then the pressure was reduced slowly to 4.0 kPa and esterification (dehydration) was carried out. After reaching a target pressure, esterification was carried out by further heating to 100 to 110° C. The reaction was carried out at 4.0 kPa until no further distillation of water and low boiling components occurred, so that a borate (F1-2) was obtained.

Example 1

An electrolytic solution of the present invention was obtained by dissolving 20.0 g of an electrolyte (C-1) and 2.0 g of azelaic acid (D-1) in 73.0 g of an organic solvent (E-1) (GBL) and further adding 5 g of a borate (F1-1).

Example 2

An electrolytic solution of the present invention was obtained by dissolving 20.0 g of an electrolyte (C-1) and 2.0 g of azelaic acid (D-1) in an organic solvent (E-2) (a mixed solvent of 68.0 g of GBL and 5.0 g of ethylene glycol (weight ratio=93:7)) and further adding 5.0 g of a borate (F1-1).

Example 3

An electrolytic solution of the present invention was obtained by dissolving 20.0 g of an electrolyte (C-1) and 2.0 g of adipic acid (D-2) in an organic solvent (E-3) (a mixed solvent of 68.0 g of GBL and 6.0 g of ethylene glycol (weight ratio=92:8)) and further adding 4.0 g of a borate (F1-2).

Example 4

An electrolytic solution of the present invention was obtained by dissolving 20.0 g of an electrolyte (C-1) and 1.5 g of adipic acid (D-2) in 75 g of an organic solvent (E-4) (a mixed solvent of 67.5 g of GBL and 7.5 g of ethylene glycol (weight ratio=90:10)), further adding 3.5 g of a boric acid and dissolving it by stirring at 100° C. for 10 minutes.

Example 5

An electrolytic solution of the present invention was obtained by dissolving 20.0 g of an electrolyte (C-1) and 0.6 g of adipic acid (D-2) in 75.9 g of an organic solvent (E-4), further adding 3.5 g of a boric acid and dissolving it by stirring at 100° C. for 10 minutes.

Example 6

An electrolytic solution of the present invention was obtained by dissolving 20.0 g of an electrolyte (C-1) and 4.5 g of adipic acid (D-2) in 72 g of an organic solvent (E-4), further adding 3.5 g of a boric acid and dissolving it by stirring at 100° C. for 10 minutes.

Example 7

An electrolytic solution of the present invention was obtained by dissolving 20.0 g of an electrolyte (C-1) and 1.5 g of benzoic acid (D-3) in 75 g of an organic solvent (E-4), further adding 3.5 g of a boric acid and dissolving it by stirring at 100° C. for 10 minutes.

Example 8

An electrolytic solution of the present invention was obtained by dissolving 20.0 g of an electrolyte (C-1) and 0.3 g of adipic acid (D-2) in 76.2 g of an organic solvent (E-4), further adding 3.5 g of a boric acid and dissolving it by stirring at 100° C. for 10 minutes.

Example 9

An electrolytic solution of the present invention was obtained by dissolving 20.0 g of an electrolyte (C-1) and 5.5 g of adipic acid (D-2) in 71 g of an organic solvent (E-4), further adding 3.5 g of a boric acid and dissolving it by stirring at 100° C. for 10 minutes.

Comparative Example 1

A comparative electrolytic solution was obtained by dissolving 20.0 g of an electrolyte (C-1) in 80.0 g of an organic solvent (E-1) (GBL).

Comparative Example 2

A comparative electrolytic solution was obtained by dissolving 20.0 g of an electrolyte (C-1) in 73.0 g of an organic solvent (E-1) (GBL) and further adding 5 g of a borate (F1-1).

Comparative Example 3

A comparative electrolytic solution was obtained by dissolving 10.0 g of ammonium azelate in 90.0 g of ethylene glycol.

The formulations of the electrolytic solutions of Examples 1 to 9 and Comparative Examples 1 to 3 are shown in Table 1.

TABLE 1

| | | Electrolytic solution formulation | Formulation ratio (wt %) | pKa of carboxylic acid (D) | D/(C + E) Wt % |
|---|---|---|---|---|---|
| Example 1 | C-1 | 1,2,3,4-Tetramethylimidazolinium diethyl phosphate | 20 | 4.39 | 2.2 |
| | D-1 | Azelaic acid | 2 | | |
| | F1-1 | Borate | 5 | | |
| | E-1 | γ-Butyrolactone | 73 | | |
| Example 2 | C-1 | 1,2,3,4-Tetramethylimidazolinium diethyl phosphate | 20 | 4.39 | 2.2 |
| | D-1 | Azelaic acid | 2 | | |
| | F1-1 | Borate | 5 | | |
| | E-2 | γ-Butyrolactone | 68 | | |
| | | Ethylene glycol | 5 | | |
| Example 3 | C-1 | 1,2,3,4-Tetramethylimidazolinium diethyl phosphate | 20 | 4.26 | 2.1 |
| | D-2 | Adipic acid | 2 | | |
| | F1-2 | Borate | 4 | | |
| | E-3 | γ-Butyrolactone | 68 | | |
| | | Ethylene glycol | 6 | | |
| Example 4 | C-1 | 1,2,3,4-Tetramethylimidazolinium diethyl phosphate | 20 | 4.26 | 1.6 |
| | D-2 | Adipic acid | 1.5 | | |
| | F | Boric acid | 3.5 | | |
| | E-4 | γ-Butyrolactone | 67.5 | | |
| | | Ethylene glycol | 7.5 | | |
| Example 5 | C-1 | 1,2,3,4-Tetramethylimidazolinium diethyl phosphate | 20 | 4.26 | 0.6 |
| | D-2 | Adipic acid | 0.6 | | |
| | F | Boric acid | 3.5 | | |
| | E-4 | γ-Butyrolactone | 68.3 | | |
| | | Ethylene glycol | 7.6 | | |
| Example 6 | C-1 | 1,2,3,4-Tetramethylimidazolinium diethyl phosphate | 20 | 4.26 | 4.9 |
| | D-2 | Adipic acid | 4.5 | | |
| | F | Boric acid | 3.5 | | |
| | E-4 | γ-Butyrolactone | 64.8 | | |
| | | Ethylene glycol | 7.2 | | |
| Example 7 | C-1 | 1,2,3,4-Tetramethylimidazolinium diethyl phosphate | 20 | 4.21 | 1.6 |
| | D-3 | Benzoic acid | 1.5 | | |
| | F | Boric acid | 3.5 | | |
| | E-4 | γ-Butyrolactone | 67.5 | | |
| | | Ethylene glycol | 7.5 | | |
| Example 8 | C-1 | 1,2,3,4-Tetramethylimidazolinium diethyl phosphate | 20 | 4.26 | 0.3 |
| | D-2 | Adipic acid | 0.3 | | |
| | F | Boric acid | 3.5 | | |
| | E-4 | γ-Butyrolactone | 68.6 | | |
| | | Ethylene glycol | 7.6 | | |
| Example 9 | C-1 | 1,2,3,4-Tetramethylimidazolinium diethyl phosphate | 20 | 4.26 | 6.0 |
| | D-2 | Adipic acid | 5.5 | | |
| | F | Boric acid | 3.5 | | |
| | E-4 | γ-Butyrolactone | 63.9 | | |
| | | Ethylene glycol | 7.1 | | |
| Comparative Example 1 | C-1 | 1,2,3,4-Tetramethylimidazolinium diethyl phosphate | 20 | — | — |
| | E-1 | γ-Butyrolactone | 80 | | |
| Comparative Example 2 | C-1 | 1,2,3,4-Tetramethylimidazolinium diethyl phosphate | 20 | — | — |
| | F1-1 | Borate | 5 | | |
| | E-1 | γ-Butyrolactone | 73 | | |
| Comparative Example 3 | | Ammonium azelate | 10 | — | — |
| | E | Ethylene glycol | 90 | | |

Using the electrolytic solutions obtained in Examples 1 to 9 and Comparative Examples 1 to 3, rolled-up aluminum electrolytic capacitors (rated voltage of 100 V, electrostatic capacitance of 30 μF, size: 10 mm in diameter, 10 mm in length) were produced. Butyl rubber vulcanized with a peroxide was used for a sealing rubber. The aluminum electrolytic capacitors produced were subjected to measurement of the electrostatic capacitance (C) at the start, 1000 hours after, and 2000 hours after a heat resistance test {leaving at rest at 125° C.), the change rate thereof (ΔC %), the loss angle tangent (tan δ), and the leakage current (LC).

Specifically, the electrostatic capacitance (C), the change rate of electrostatic capacitance (ΔC %), and the loss angle tangent (tan δ) were measured at a frequency of 100 kHz by using an LCR meter (4284A, manufactured by Agilent Technologies). As to the leakage current (LC), a current value was measured one minute after applying the rated voltage. The results are shown in Table 2.

TABLE 2

| | Initial | | | 1000 hours | | | 2000 hours | | |
|---|---|---|---|---|---|---|---|---|---|
| | C (μF) | tan δ (%) | LC (μA) | ΔC (%) | tan δ (%) | LC (μA) | ΔC (%) | tan δ (%) | LC (μA) |
| Example 1 | 29 | 9 | 1.1 | −10 | 12 | 1.4 | −10 | 11 | 1.4 |
| Example 2 | 29 | 8 | 1.2 | −10 | 12 | 1.2 | −10 | 11 | 1.3 |
| Example 3 | 29 | 9 | 1.4 | −10 | 12 | 1.3 | −10 | 12 | 1.3 |
| Example 4 | 29 | 8 | 0.9 | −8 | 9 | 1.0 | −8 | 9 | 1.0 |
| Example 5 | 29 | 8 | 1.8 | −12 | 12 | 2.3 | −13 | 16 | 2.9 |
| Example 6 | 29 | 13 | 0.9 | −12 | 18 | 1.6 | −13 | 22 | 1.8 |
| Example 7 | 29 | 9 | 0.9 | −8 | 9 | 1.0 | −7 | 13 | 1.1 |
| Example 8 | 29 | 12 | 1.1 | −12 | 9 | 9.2 | −12 | 9 | 30.2 |
| Example 9 | 29 | 12 | 1.8 | −12 | 25.3 | 2.3 | −13 | 43.2 | 2.9 |
| Comparative Example 1 | 29 | 10 | 1.9 | Short circuit occurred. | | | Short circuit occurred. | | |
| Comparative Example 2 | 29 | 10 | 1.9 | −11 | 20 | 10.3 | Short circuit occurred. | | |
| Comparative Example 3 | 29 | 19 | 1.5 | −12 | 36 | 2.3 | −20 | 160 | 2.9 |

As shown in Table 2, no short circuit occurred in the initial stage in all of Examples 1 to 9 and Comparative Examples 1 to 3, and this means that the sparking voltage was high in all of the Examples and the Comparative Examples. However, a short circuit occurred within 2000 hours in Comparative Examples 1 and 2.

Moreover, in Examples 1 to 9, the leakage current (L) in the initial stage was low and this means that there was a little short circuit risk, and in Examples 1 to 7 and 9, the leakage current (LC) was low also at 2000 hours and this means that there was further little short circuit risk.

In Examples 1 to 9, the loss angle tangent (tan δ) in the initial stage was smaller than that of Comparative Example 3 and this shows that characteristic deterioration was also little, and in Examples 1 to 8, tan δ was small also at 2000 hours and this shows that characteristic deterioration was further little.

INDUSTRIAL APPLICABILITY

Aluminum electrolytic capacitors using the electrolytic solution of the present invention are highly reliable and therefore can be used for cars and household electric appliances with high working voltage.

The invention claimed is:

1. An electrolytic solution for aluminum electrolytic capacitors, comprising
an electrolyte (C) comprising at least one alkyl phosphate anion (A) selected from the group consisting of anions represented by the following formula (1) and anions represented by the following formula (2) and an amidinium cation (B),
at least one boric acid compound (F) selected from the group consisting of boric acid and a borate (F1),
a carboxylic acid (D) having 2 to 15 carbon atoms consisting of carbon atoms, oxygen atoms, and hydrogen atoms, and
an organic solvent (E)

[Chemical Formula 1]

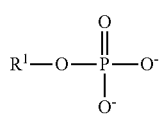

(1)

-continued

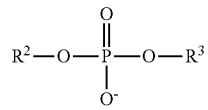

(2)

in formula (1), R1 is an alkyl group having 1 to 10 carbon atoms; in formula (2), R2 is an alkyl group having 1 to 10 carbon atoms, and R3 is a hydrogen atom or an alkyl group having 1 to 10 carbon atoms.

2. The electrolytic solution according to claim 1, including the carboxylic acid (D) in an amount of 0.5 to 5% by weight based on the total weight of the electrolyte (C) and the organic solvent (E).

3. The electrolytic solution according to claim 1, wherein when the carboxylic acid (D) is a polycarboxylic acid, at least one acid dissociation exponent (pKa) of the polycarboxylic acid is 3.8 to 5.5.

4. The electrolytic solution according to claim 1, wherein the carboxylic acid (D) is a divalent aliphatic carboxylic acid (D1).

5. The electrolytic solution according to claim 4, wherein the divalent aliphatic carboxylic acid (D1) is at least one member selected from the group consisting of adipic acid, azelaic acid, and sebacic acid.

6. The electrolytic solution according to claim 1, wherein the alkyl phosphate anion (A) is represented by formula (2), and in formula (2), R2 and R3 are alkyl groups having from 1 to 8 carbon atoms.

7. The electrolytic solution according to claim 1, wherein the amidinium cation (B) is an imidazolinium cation or an imidazolium cation.

8. The electrolytic solution according to claim 1, wherein the borate (F1) is a reaction product produced by reacting a monohydric alcohol and/or a polyhydric alcohol and boric acid.

9. The electrolytic solution according to claim 1, wherein the organic solvent (E) is at least one member selected from the group consisting of alcohols, lactones, and sulfones.

10. The electrolytic solution according to claim 1, wherein the boric acid compound (F) is boric acid and the organic solvents (E) is a mixed solvent of a dihydric alcohol and a lactone.

11. The electrolytic solution according to claim 2, wherein when the carboxylic acid (D) is a polycarboxylic acid, at least one acid dissociation exponent (pKa) of the polycarboxylic acid is 3.8 to 5.5.

12. The electrolytic solution according to claim 2, wherein the carboxylic acid (D) is a divalent aliphatic carboxylic acid (D1).

13. The electrolytic solution according to claim 12, wherein the divalent aliphatic carboxylic acid (D1) is at least one member selected from the group consisting of adipic acid, azelaic acid, and sebacic acid.

14. The electrolytic solution according to claim 2, wherein the alkyl phosphate anion (A) is represented by formula (2), and in formula (2), R2 and R3 are alkyl groups having from 1 to 8 carbon atoms.

15. The electrolytic solution according to claim 2, wherein the amidinium cation (B) is an imidazolinium cation or an imidazolium cation.

16. The electrolytic solution according to claim 2, wherein the borate (F1) is a reaction product produced by reacting a monohydric alcohol and/or a polyhydric alcohol and boric acid.

17. The electrolytic solution according to claim 2, wherein the organic solvent (E) is at least one member selected from the group consisting of alcohols, lactones, and sulfones.

18. The electrolytic solution according to claim 3, wherein the carboxylic acid (D) is a divalent aliphatic carboxylic acid (D1).

19. The electrolytic solution according to claim 18, wherein the divalent aliphatic carboxylic acid (D1) is at least one member selected from the group consisting of adipic acid, azelaic acid, and sebacic acid.

20. An aluminum electrolytic capacitor using the electrolytic solution according to claim 1.

* * * * *